United States Patent
Parellada

[19]

[11] Patent Number: 5,981,027
[45] Date of Patent: Nov. 9, 1999

[54] FASTENING MEMBER WITH LOOPS AND PROCESS AND MACHINE FOR PRODUCING IT

[75] Inventor: Luis Parellada, Barcelona, Spain

[73] Assignee: Velcro Industries B.V., Curacao, Netherlands Antilles

[21] Appl. No.: 08/756,236

[22] Filed: Nov. 26, 1996

[51] Int. Cl.[6] .................................................. A44B 18/00
[52] U.S. Cl. ............................. 428/120; 24/442; 24/444; 24/450; 24/451; 24/452; 428/99; 428/100
[58] Field of Search ........................... 428/99, 100, 120; 24/452, 451, 442, 450, 444

[56] References Cited

U.S. PATENT DOCUMENTS

| | | | |
|---|---|---|---|
| 3,577,607 | 5/1971 | Ikoma et al. | 24/204 |
| 3,835,508 | 9/1974 | Bini | 24/204 |
| 4,169,303 | 10/1979 | Lemelson | 24/452 |
| 4,376,152 | 3/1983 | Bennett | 428/100 |
| 4,761,318 | 8/1988 | Ott et al. | 428/85 |
| 4,999,067 | 3/1991 | Erb et al. | 156/73.1 |
| 5,032,122 | 7/1991 | Noel et al. | 604/391 |
| 5,256,231 | 10/1993 | Gorman et al. | 156/178 |
| 5,326,612 | 7/1994 | Goulait | 428/100 |
| 5,380,313 | 1/1995 | Goulait et al. | 604/391 |
| 5,407,439 | 4/1995 | Goulait | 604/391 |
| 5,470,417 | 11/1995 | Goulait | 156/201 |
| 5,518,795 | 5/1996 | Kennedy et al. | 428/100 |
| 5,647,864 | 7/1997 | Allen | 24/442 |

FOREIGN PATENT DOCUMENTS

| | | |
|---|---|---|
| 0 289 198 A1 | 11/1988 | European Pat. Off. . |
| 0 661 008 A2 | 7/1995 | European Pat. Off. . |
| 0 741 979 A2 | 11/1996 | European Pat. Off. . |
| 579886 | 9/1976 | Switzerland ............. 24/42 |

OTHER PUBLICATIONS

English translation of Hamano, Swiss Patent No. 579,886, cited by Examiner on May 18, 1998.

PCT International Search Report for PCT/EP97/06667, mailed Apr. 29, 1998 (4 pp).

*Primary Examiner*—Nasser Ahmad
*Attorney, Agent, or Firm*—Fish & Richardson P.C.

[57] ABSTRACT

A sheet fastener product and method for its manufacture. The product includes a molded base portion with an array of integrally molded projections extending at spaced intervals from one surface of the base securing a length of yarn at spaced intervals to form loops. In use, the product can be used to create a fastening by mating the loops with hook fastening elements. The manufacturing method includes a continuous forming process.

17 Claims, 7 Drawing Sheets

FASTENING MEMBER WITH LOOPS AND PROCESS AND MACHINE FOR PRODUCING IT

BACKGROUND OF THE INVENTION

This invention relates to a fastening product that presents multiple loops for cooperative engagement with mating fastening hook members to provide a fastening, and to a process for its production.

Fastener systems employing hook and loop components are in general use. As described by Fischer U.S. Pat. No. 4,872,243, it has been known that the member with hooks can be produced as a sheet product in a continuous extrusion molding process, with considerable cost and functional advantage. The member with loops, however, is generally formed as a woven product or with other techniques having drawbacks relating to cost, complexity or performance.

SUMMARY OF THE INVENTION

It is realized, according to the invention, that by forming the loops in the second fastening element from yarn secured to a base portion by spaced projections integrally molded to the base portion, both the hook and the fastening elements can be produced with substantially the same equipment and processes which, depending on the circumstances, can realize advantages in cost savings or reduced complexity or improved performance. The lower cost of the invention can make it particularly applicable to products such as surgical gowns, bandages and other articles or packaging materials which are intended for one-time use.

According to one aspect of the invention, a sheet product is provided comprising a molded base portion, an array of molded projections integral with the base portion and extending at spaced intervals from one surface of the base portion, and at least one length of yarn extending past a number of the projections and being secured to the base portion by the projections in a deformed state.

Preferred embodiments contain at least one of the following features:

The sheet product has a plurality of rows of projections and a plurality of yarns associated with the respective rows; the yarn forms loops suitable for cooperative fastening with a mating fastener member; the molded projections are arranged in localized pairs, the yarn being disposed between projections of respective pairs of the projections; the outer ends of the projections are heat-bonded to the base; the yarn is in a texturized form as if permanently deformed by a stuff-and-crimp process; and the projections are heat-bonded to the yarns.

In other embodiments, the product additionally comprises an array of hook elements joined to the base portion and extending from an opposite surface of the base portion, and may be integrally molded with the base portion.

In another aspect of the invention, a fastener is provided, the fastener comprising a product and a mating fastener member having hook elements engaged with the loops of the product, the product comprising a molded base portion, an array of molded projections integral with the base portion and extending at spaced intervals from one surface of the base portion, and at least one length of yarn extending past a number of the projections and being secured to the base portion by the projections in a deformed state.

Another aspect of the invention relates to a process for producing a product, the product comprising a molded base portion, an array of molded projections integral with the base portion and extending at spaced intervals from one surface of the base portion, and at least one length of yarn extending past a number of the projections and being secured to the base portion by the projections in a deformed state of claim 1. The process comprises molding the base portion with the integral projections by continuous extrusion of molten plastic material against a moving roller that defines molding cavities for the projections, placing the yarn against the base portion in close proximity to the projections, and deforming the projections to secure the yarn.

Preferred embodiments of the inventive process include at least one of the following steps: deforming the projections by heat and pressure; causing the product to shrink or compact longitudinally following the deforming of the projections, thereby causing the yarn to buckle or form loops between spaced projections; plastically stretching the base portion; applying heat to shrink the base portion, thereby forming loops from the yarn between the projections.

In another embodiment, the base portion is produced in a running length, and the base portion is stretched lengthwise by adjusting the tension applied to the base portion by a take-up roller engaged with the product following molding.

In yet another embodiment, the product is shrunk longitudinally by being stretched laterally. projections.

In another aspect of the inventive process, the process comprises molding the base portion with the integral projections, placing the yarn against the base portion in close proximity to the projections, with loops of yarn extending outward from the base portion between the projections, and deforming the projections to secure the yarn.

In other embodiments, a second sheet is applied to the back surface of the base portion. In some cases the second sheet carries hook fastener elements.

In another aspect of the invention, an apparatus is provided for the production of a sheet product comprising a molded base portion, an array of molded projections integral with the base portion and extending at spaced intervals from one surface of the base portion, and at least one length of yarn extending past a number of the projections and being secured to the base portion by the projections in a deformed state. The apparatus comprises a moving roller that defines molding cavities for molding the projections, and a deforming surface capable of deforming the projections to secure the length of yarn to the base portion.

In some embodiments the deforming surface is disposed about the periphery of a second moving roller.

In a preferred embodiment the deforming surface is at an elevated temperature.

In yet another embodiment the apparatus further comprising stretching means to stretch the product laterally, in some cases with a tenter frame.

DESCRIPTION OF THE PREFERRED EMBODIMENTS

The figures show sheet fastener products, processes and machines for producing them, according to the present invention, the products including yarn elements fastened to a base portion to form loops for mating with hook fastener elements.

Figure 6:
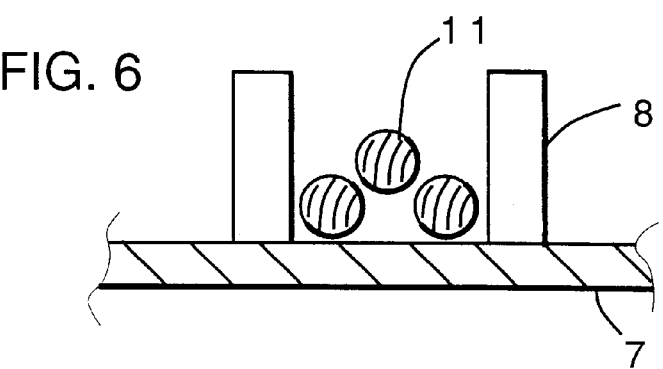
Figure 8:
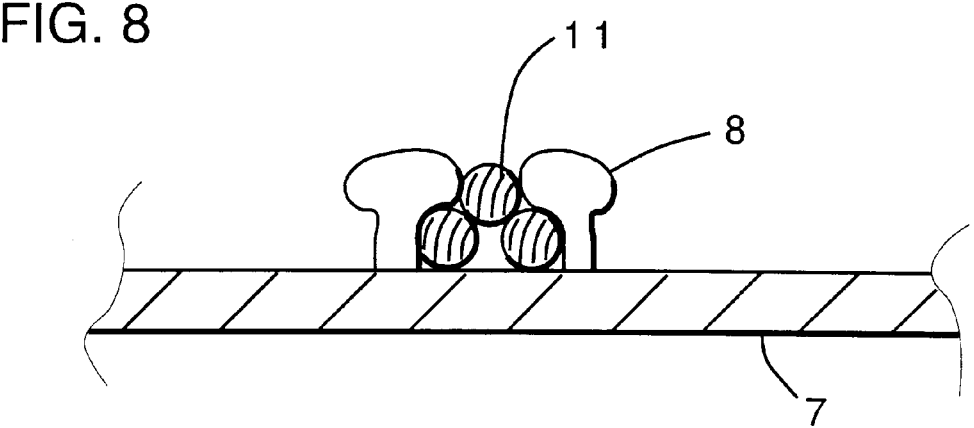

Referring first to FIGS. 6 and 8, the sheet fastener product comprises a base portion 7 and several rows of integrally molded projections extending from one surface of the base at spaced intervals and securing lengths of yarn 11 to form loops 12 between adjacent pairs of projections.

Figure 1:
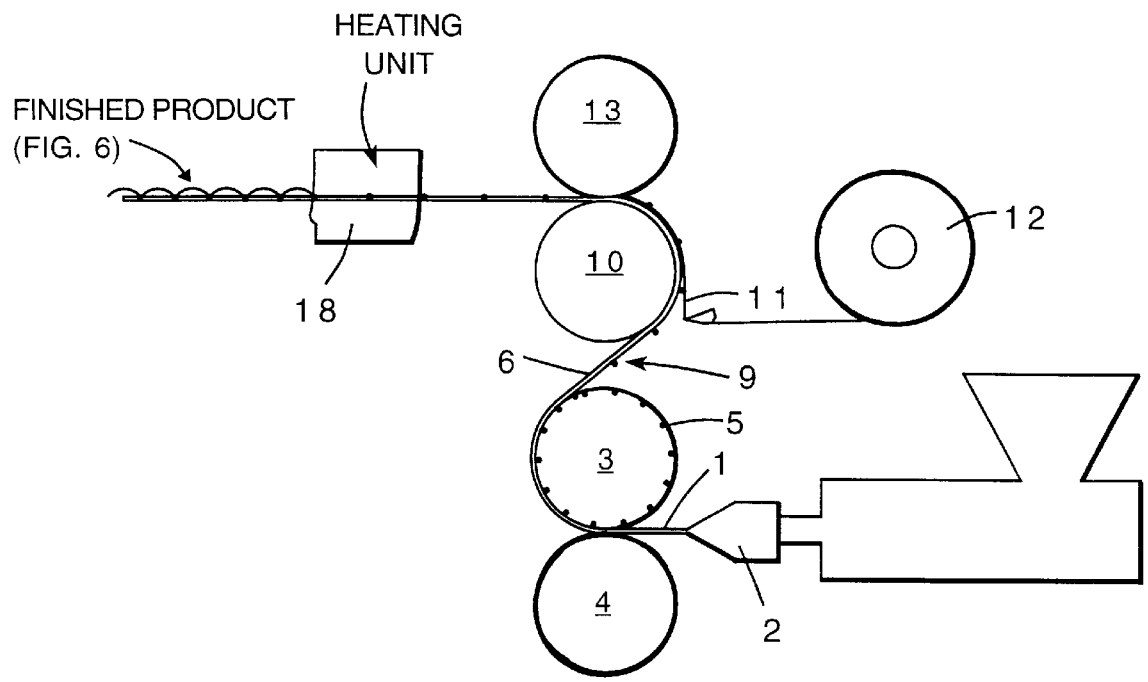
FIG. 1 illustrates a process and machine for making a sheet fastener product.

Referring to FIG. 1, a preferred embodiment of a machine and procedure for making the product follows the teachings of the Fischer U.S. Pat. Nos. 4,775,310, 4,794,028, and 4,872,243, which are hereby incorporated by reference herein as if fully set forth. This embodiment begins with the production of a continuous extrusion 1 of molten polymer resin from an extrusion head 2. The molten polymer is molded between first and second forming rollers 3 and 4, which are mounted for concurrent rotation in opposite rotation around parallel axes. The first roller 3 is a cooled forming roller defining a multiplicity of projection-forming cavities 5 around its circumference for forming projections of the molded sheet product. The second roller 4 is a pressure forming roller which forms a nip with the cooling roller 3 at a prespecified spacing to form the base of the molded sheet product 6 and ensures filling of the mold cavities.

Figure 2:
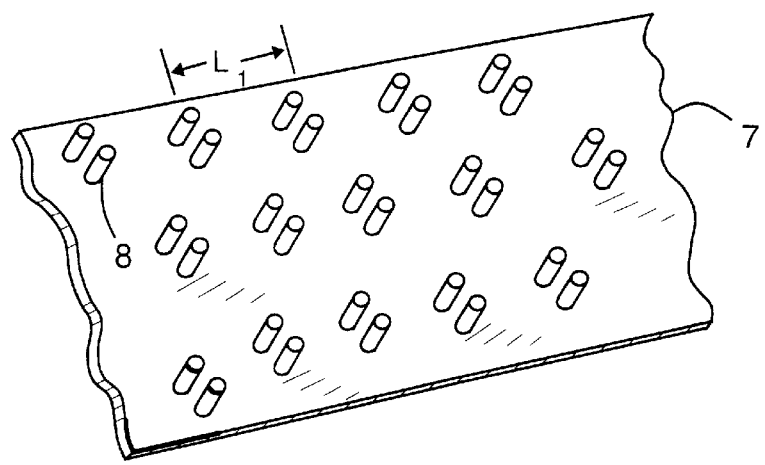
FIG. 2 is a plan view of the product as molded.

After the product leaves the forming area between rollers 3 and 4 it is extracted from roller 3 as a sheet-form product 6. FIG. 2 illustrates one preferred layout of this sheet product, comprising a base portion 7 and longitudinal rows of pairs of integrally molded projections 8, adjacent pairs in each row separated by a distance $L_1$.

Figure 3:
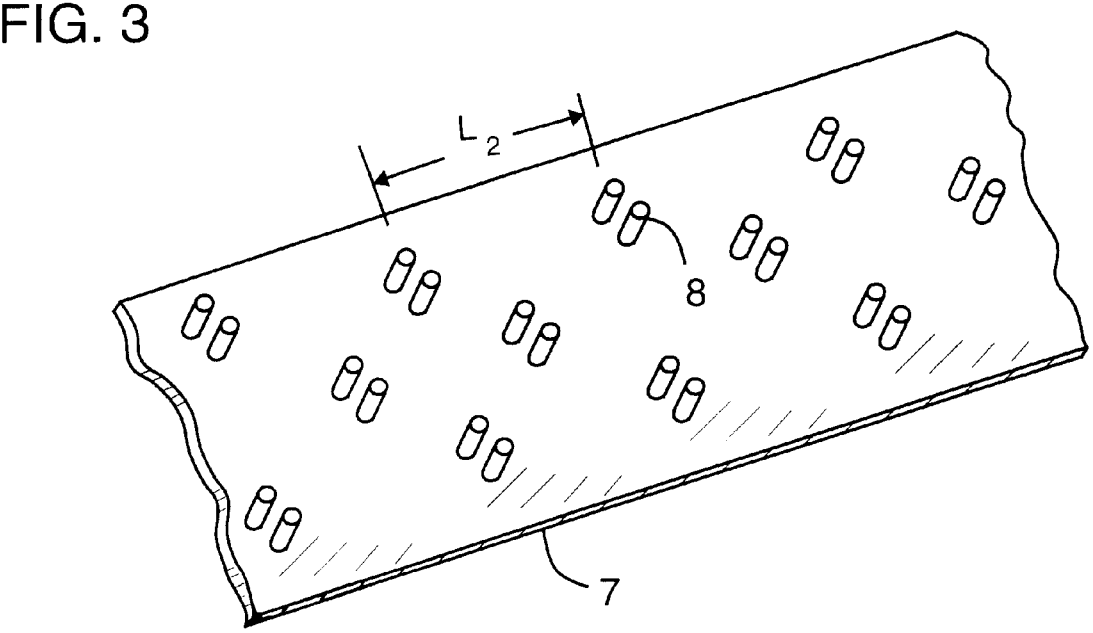
FIG. 3 is a plan view of the molded product as stretched.

Referring back to FIG. 1, after removal from the molding roll the product is preferably longitudinally stretched in area 9 between cooling forming roller 3 and take-up roller 10. The distance between adjacent pairs of projections is extended to $L_2$, as illustrated in FIG. 3, where $L_2$ is greater than $L_1$. In this stretching, the base of the product is stretched enough to cause yielding of the base portion in a longitudinal direction, for subsequent shrinkage in a later step.

Figure 4:
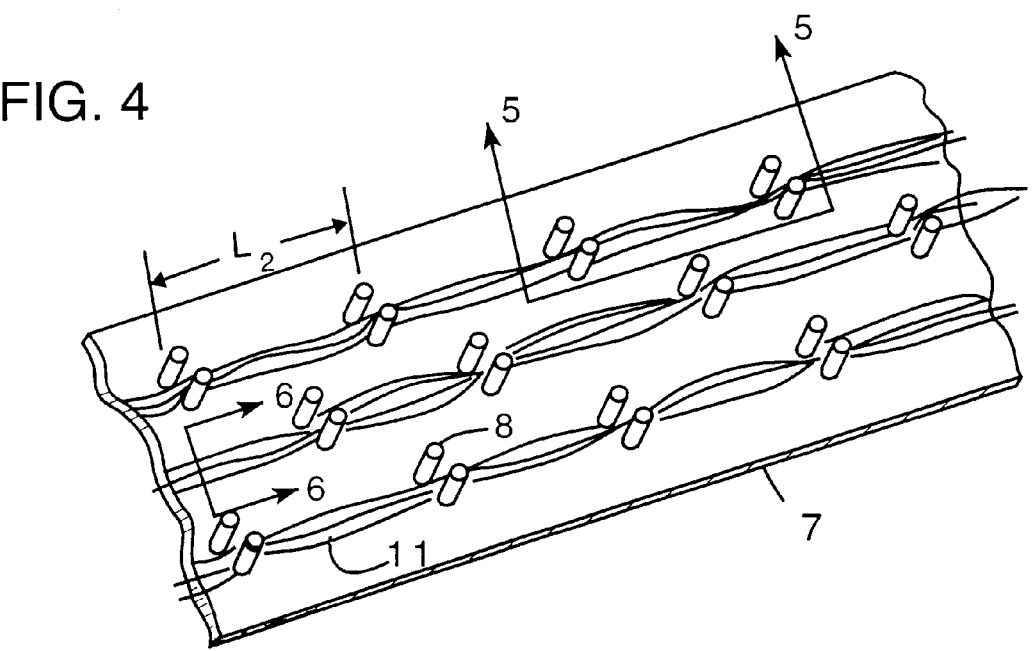
FIGS. 4–6 illustrate the product after the yarns have been placed.
Figure 5:
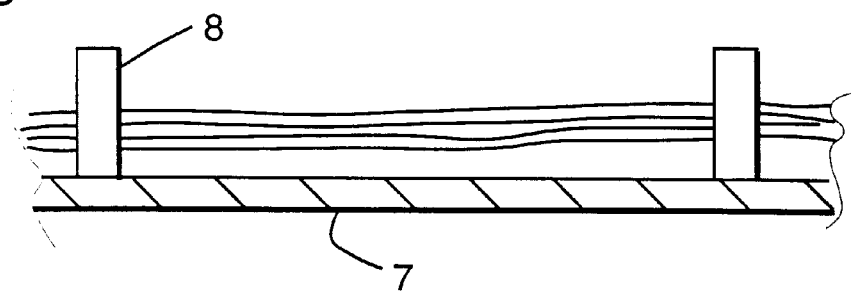

FIG. 1 further portrays strands of suitably texturized, multi-filament yarn 11 being spooled from a warp beam 12 and placed in close proximity to the base of the product between the projections of the pairs. The product then enters a nip between take-up roller 10 and heated deforming roller 13. The product is configured as shown in FIGS. 4, 5 and 6, with the base portion 7 still longitudinally stretched as it enters this nip.

Figure 7:
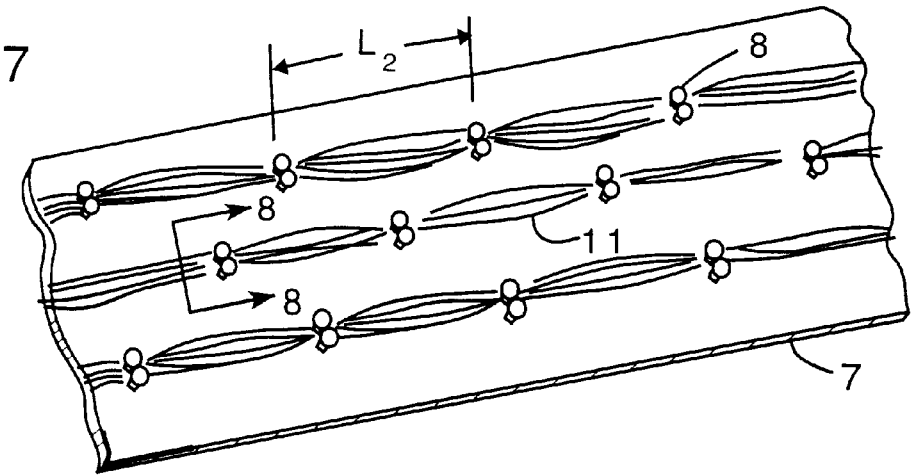
FIGS. 7 and 8 show the product after the projections have been deformed.

The heated deforming roller 13 and take-up roller 10 shown in FIG. 1 are mounted for concurrent rotation in opposite rotation around parallel axes. Deforming roller 13 applies sufficient heat and pressure to projections 8 to cause them to be deformed as shown in FIGS. 7 and 8, thereby securing yarn 11 at discrete intervals against any further longitudinal motion with respect to base portion 7. In preferred instances, the thermoplastic resinous material of the posts and/or of the yarn is heated sufficiently to form an adhesive bond between posts and yarn. The heating is insufficient to cause shrinkage of the base portion 7 at this stage.

After the yarn is thus secured by passing between rollers 10 and 13, the product is passed through a heating unit 18 that causes the base portion 7 to be heated and shrink in the longitudinal direction, thereby decreasing the separation distance between pairs of projections.

Figure 9:
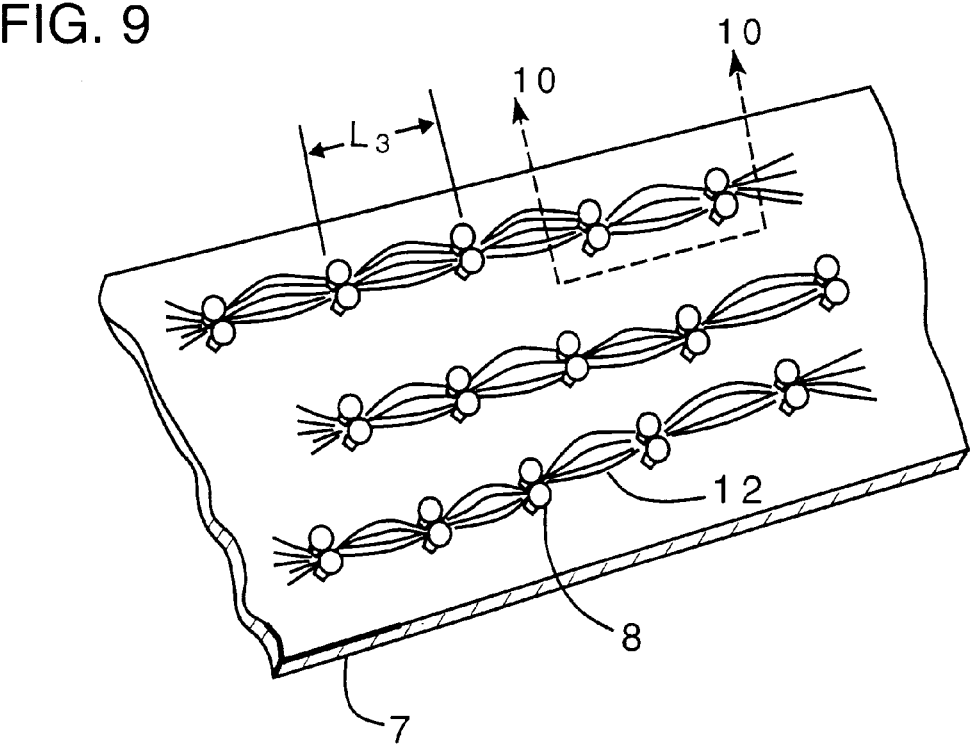
FIGS. 9 and 10 show the finished product.
Figure 10:
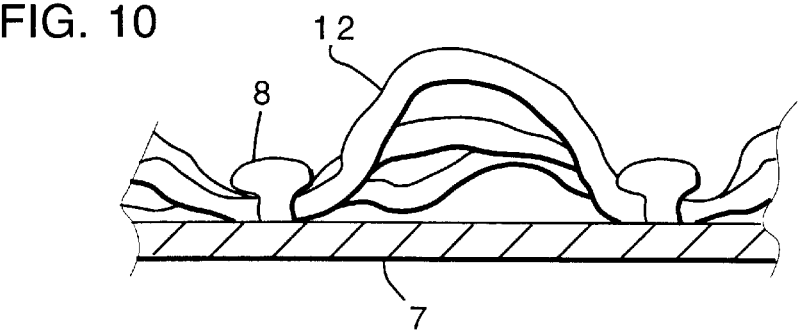

In practice, the separation distance between pairs of projections becomes $L_3$ as shown in FIGS. 9 and 10, where $L_3$ is less than $L_2$. This reduction in projection separation causes the yarn 11 between pairs of projections to buckle, forming loops 12 that are raised sufficiently to be engageable by fastener hooks.

In alternative embodiments the web can be reduced in length with less or no heat by passing through a longitudinal compacting unit such as a microcreper such as is illustrated in U.S. Pat. Nos. 3,426,405 and 5,060,349, available from Micrex Corporation of Walpole, Mass. In this case it is not necessary to prestretch the product in its passage from the molding roller to the take-up roller.

Figure 11:
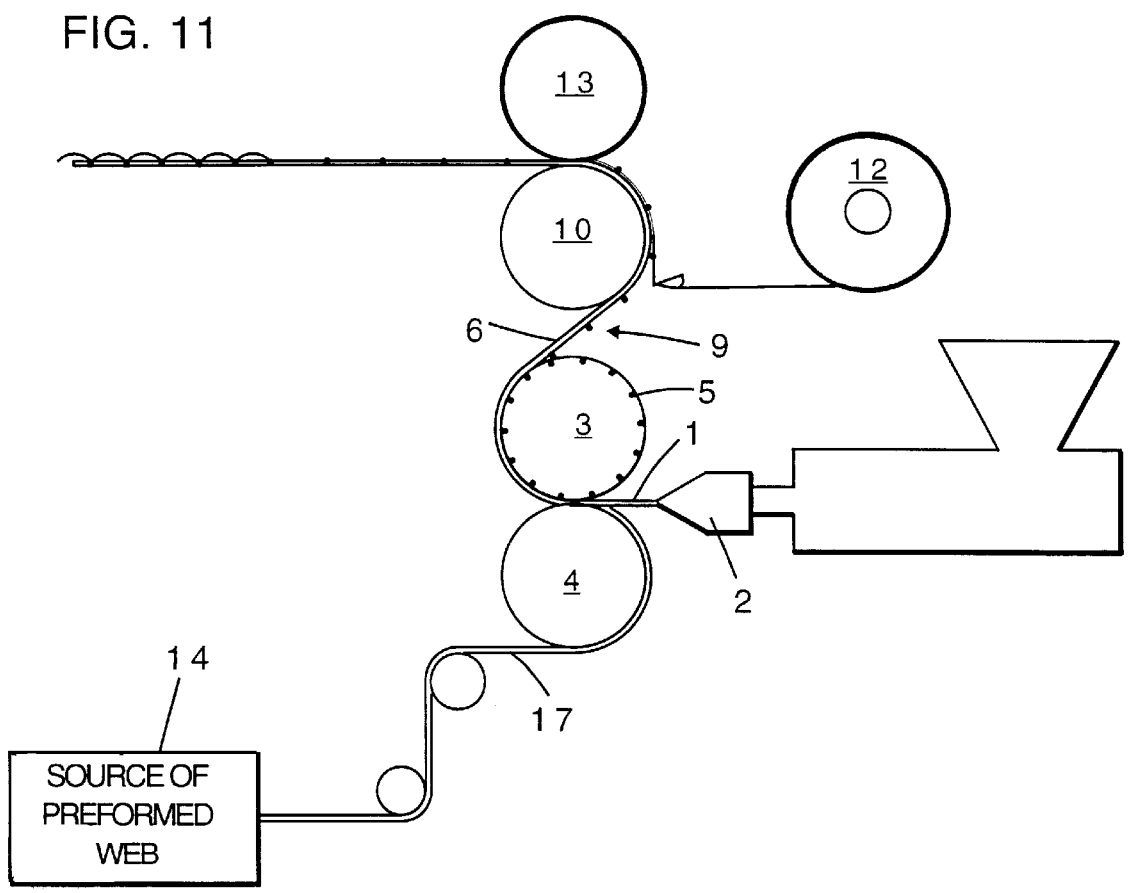
FIGS. 11 and 12 illustrate similar processes and machines which respectively add a preformed web and integrally molded hooks to the product.

FIG. 11 illustrates another embodiment of the process, showing the addition of a second sheet 17 which is joined to the opposite side of base portion 7 during the molding process, following the techniques of U.S. Pat. Nos. 5,260,015 and 5,518,795, which are hereby incorporated by reference herein as if fully set forth. In another case, the web may be contracted lengthwise by subjecting it to widthwise stretch as with a tenter frame. The second sheet 13, which is a preformed web, is shown leaving a source 14 and entering the molding area between rollers 3 and 4 along with the extrusion 1 of molten resin. Such a second sheet may comprise mating hook elements, e.g. of hook, palm tree or mushroom form, to functionally engage loops 12 in use.

Figure 12:
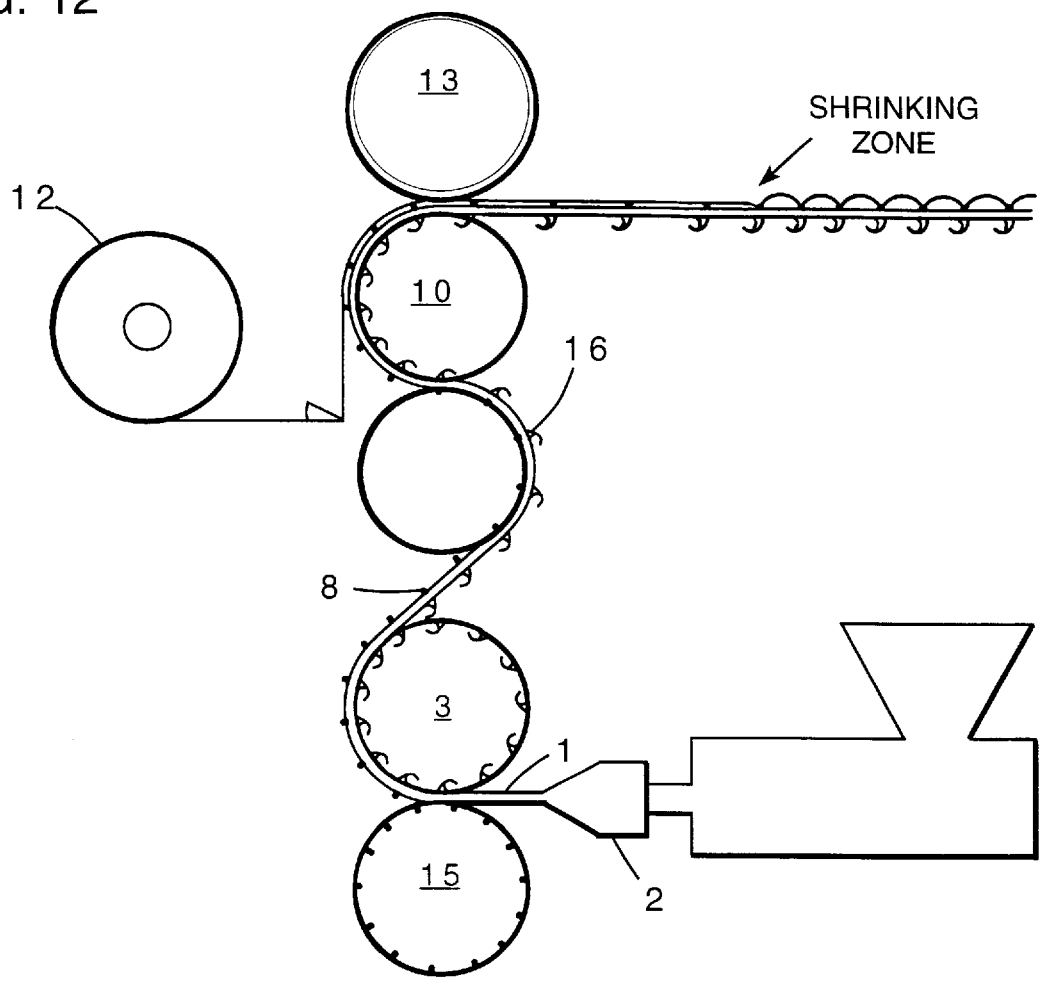

Another embodiment of the process, shown in FIG. 12, produces a sheet product having hooks integrally molded to the opposite side of the base portion from the side on which are molded posts 8. In this embodiment, pressure forming roller 4 is replaced with pressure forming roller 15 defining a multiplicity of post-forming cavities around its circumference, and roller 3 is provided with hook-forming cavities. Thus, in one continuous extrusion of molten resin the sheet product comprises base portion 7 with projections 8 extending from one side and hooks 16 extending from the other.

Figure 13:
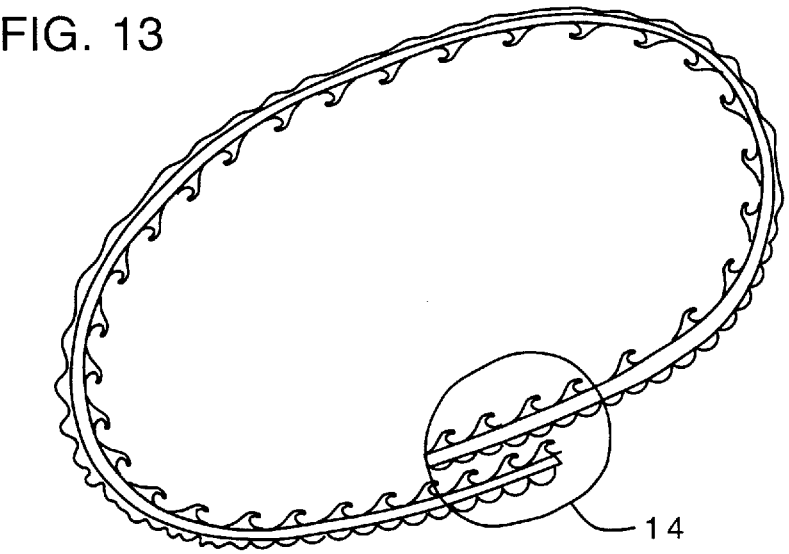
FIG. 13 illustrates a use of the product.
Figure 14:
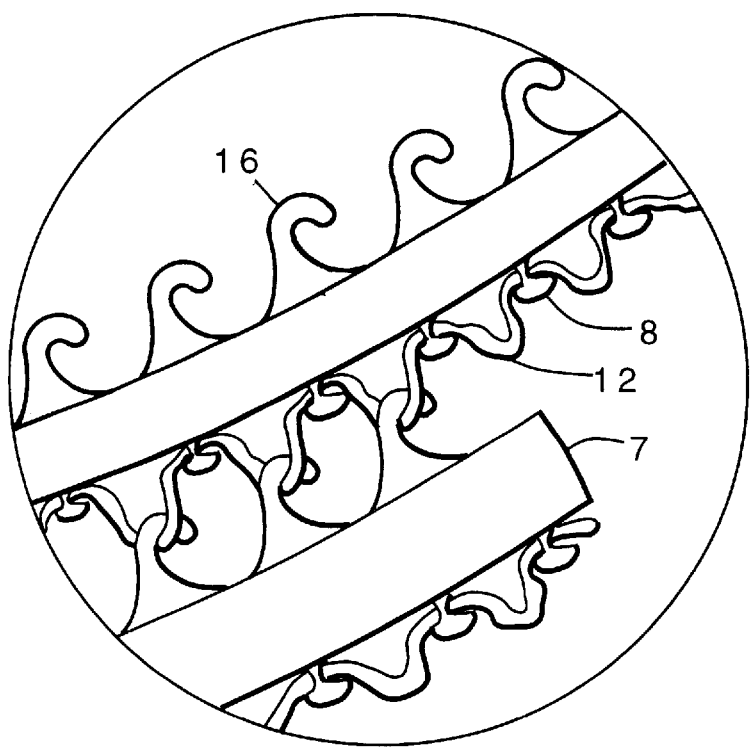
FIG. 14 is an enlargement of area 14 in FIG. 13.

FIGS. 13 and 14 illustrate a use of the sheet fastener product of the invention. In FIG. 13 a strip of the product is shown bent into an arc with opposite sides of the product engaging to form a fastening. The mechanics of the fastening are the cooperative engagement of hooks and loops illustrated in FIG. 14, which is also enlarged to show the deformations of yarn 12 that has been texturized. Texturization, in which the form of the yarn varies along its length, may be employed to help keep the yarn from moving longitudinally between the deformed projections 8. The yarn may be texturized by several common techniques including the use of a stuffer-crimper.

Resin materials suitable for use in the present invention include polypropylene, polyethylene and polyamide.

To properly secure a 10–30 filament yarn of 100–200 total denier, projections approximately 0.140 inches high and 0.120 inches thick may be employed.

Other methods such as ultrasonic welding may be used to deform projections 8 to secure yarn 11.

In certain embodiments yarn 11 may be secured by bonding adjacent projections 8 to each other to mechanically lock yarn 11 to base portion 7, by deforming projections 8 to bond the outer portion of the projections 8 to base portion 7 to lock the yarn 11, by bonding projections 8 directly to yarn 11 when similar materials are used, and by combinations of these effects.

Figure 15:
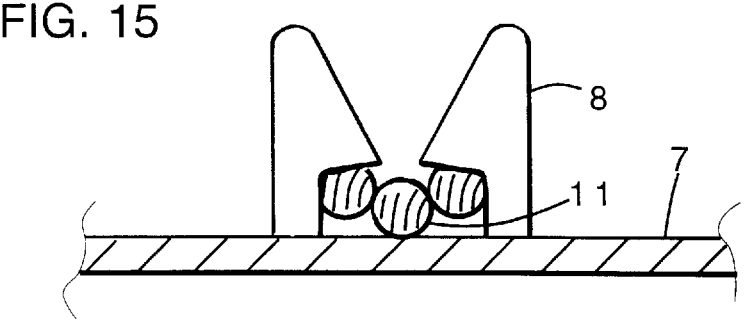
FIGS. 15 and 16 are cross-sectional views of FIG. 7, taken along line 8—8, illustrating different possible projection shapes.
Figure 16:
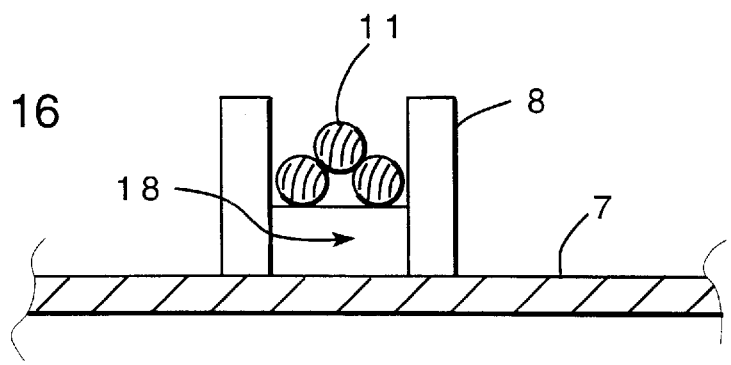

In FIG. 15, the projections are provided with extending features directed toward one another that assist in securing the yarn in place. In FIG. 16, a raised rib 18 between the projections elevates the yarns above the surface of the base to better enable engagement by the hooks, reducing the need to contract the web for forming the loops.

Cross-sections of projections 8 may have any of a variety of different shapes. In an advantageous embodiment, the facing sides of the projection comprise tapered surfaces to help align yarn 11 as it is placed between them.

Other embodiments will occur to those skilled in the art and are within the scope of the claims.

What is claimed is:

1. A sheet product comprising:

a molded base portion;

an array of molded projections integral with said base portion and extending at spaced intervals from one surface of said base portion; and at least one length of yarn extending past a number of said projections and being secured to said base portion by said projections;

wherein said molded projections are arranged in pairs of opposed projections, said yarn being disposed between the opposed projections of at least some of said pairs.

2. The product of claim 1 having a plurality of rows of said projections and a plurality of yarns associated with respective rows.

3. The product of claim 1 in which said yarn forms loops suitable for cooperative fastening with a mating fastener member.

4. The product of claim 1 in which the outer ends of said projections are heat-bonded to said base.

5. The product of claim 1 in which said projections are heat-bonded to said yarns.

6. The product of claim 1 further comprising an array of hook elements joined to said base portion and extending from an opposite surface of said base portion.

7. The product of claim 6 in which said hook elements are integrally molded with said base portion.

8. A fastener comprising the product of claim 3 and a mating fastener member having hook elements engaged with said loops.

9. The product of claim 3 in which the yarn is in a texturized form as if permanently deformed by a stuff-and-crimp process.

10. A fastener comprising:

a first fastener element including (a) a plurality of projections extending outwardly from a common base, said projections being arranged in pairs of opposed projections, and (b) yarn disposed between the opposed projections of at least some of said pairs, to secure the yarn adjacent the common base so that said yarn forms loops; and a second fastener element constructed for cooperative fastening with said loops of said first fastener element.

11. The fastener of claim 10 having a plurality of rows of said projections and a plurality of yarns associated with respective rows.

12. The fastener of claim 10 in which the outer ends of said projections are heat-bonded to said base.

13. The fastener of claim 10 in which said projections are heat-bonded to said yarns.

14. The fastener of claim 12 in which the yarn is in a texturized form as if permanently deformed by a stuff-and-crimp process.

15. The fastener of claim 12 wherein said second fastener element comprises an array of hook elements.

16. The fastener of claim 15 wherein said array of hook elements is joined to said base portion and said hook elements extend from an opposite surface of said base portion.

17. The fastener of claim 16 in which said hook elements are integrally molded with said base portion.

* * * * *